US012292852B2

(12) United States Patent
Zhang et al.

(10) Patent No.: US 12,292,852 B2
(45) Date of Patent: *May 6, 2025

(54) HIERARCHICAL NETWORKS ON CHIP (NOC) FOR NEURAL NETWORK ACCELERATOR

(71) Applicant: MOFFETT INTERNATIONAL CO., LIMITED, Hong Kong (HK)

(72) Inventors: Xiaoqian Zhang, Los Altos, CA (US); Zhibin Xiao, Los Altos, CA (US)

(73) Assignee: Moffett International Co., Limited, Hong Kong (HK)

( * ) Notice: Subject to any disclaimer, the term of this patent is extended or adjusted under 35 U.S.C. 154(b) by 0 days.

This patent is subject to a terminal disclaimer.

(21) Appl. No.: 18/382,938

(22) Filed: Oct. 23, 2023

(65) Prior Publication Data

US 2024/0338339 A1 Oct. 10, 2024

Related U.S. Application Data

(63) Continuation of application No. 18/197,506, filed on May 15, 2023, now Pat. No. 12,072,834, which is a
(Continued)

(51) Int. Cl.
*G06F 15/78* (2006.01)
*G06N 3/063* (2023.01)

(52) U.S. Cl.
CPC ......... *G06F 15/7825* (2013.01); *G06N 3/063* (2013.01)

(58) Field of Classification Search
CPC .... G06F 15/7825; G06F 15/803; G06N 3/063
See application file for complete search history.

(56) References Cited

U.S. PATENT DOCUMENTS

| 10,678,479 B1 | 6/2020 | Diamant |
| 11,620,490 B2 | 4/2023 | Ng et al. |

(Continued)

FOREIGN PATENT DOCUMENTS

| CN | 109478252 A | 3/2019 |
| CN | 111226231 A | 6/2020 |

(Continued)

OTHER PUBLICATIONS

Notice of Allowance mailed Aug. 23, 2023, issued in related U.S. Appl. No. 18/197,506 (9 pages).

(Continued)

*Primary Examiner* — Jacob Petranek
(74) *Attorney, Agent, or Firm* — Sheppard Mullin Richter & Hampton LLP

(57) ABSTRACT

This application describes a hardware accelerator and a device for accelerating neural network computations. An example accelerator may include multiple cores and a central processing unit (CPU) respectively associated with DDRs, a data exchange interface connecting a host device to the accelerator, and a three-layer NoC architecture. The three-layer NoC architecture includes an outer-layer NoC configured to transfer data between the host device and the DDRs, a middle-layer NoC configured to transfer data among the plurality of cores; and an inner-layer NoC within each core and including a cross-bar network for broadcasting weights and activations of neural networks from a global buffer of the core to a plurality of processing entity (PE) clusters within the core.

20 Claims, 10 Drawing Sheets

Related U.S. Application Data continuation of application No. PCT/CN2023/086580, filed on Apr. 6, 2023.

(56) References Cited

U.S. PATENT DOCUMENTS

| | | |
|---|---|---|
| 11,704,548 B2 | 7/2023 | Bruestle et al. |
| 2014/0126572 A1 | 5/2014 | Hutton et al. |
| 2019/0079801 A1 | 3/2019 | Lyuh et al. |
| 2019/0236049 A1 | 8/2019 | Vantrease et al. |
| 2020/0259743 A1 | 8/2020 | Gray |
| 2022/0067530 A1 | 3/2022 | Khailany et al. |
| 2022/0101085 A1* | 3/2022 | Garcia Redondo .... G06N 3/065 |
| 2022/0138563 A1 | 5/2022 | Kwon et al. |
| 2023/0022507 A1 | 1/2023 | Philippe et al. |
| 2023/0032432 A1* | 2/2023 | Jiang .................... G06N 3/0464 |
| 2023/0105945 A1* | 4/2023 | Kapoor ............... G06F 12/0891 |
| | | 711/154 |

FOREIGN PATENT DOCUMENTS

| | | |
|---|---|---|
| CN | 113986813 A | 1/2022 |
| CN | 115660054 A | 1/2023 |

OTHER PUBLICATIONS

PCT International Search Report and the Written Opinion mailed Dec. 21, 2023, issued in related International Application No. PCT/CN2023/086580 (7 pages).

Ian En-hsu Yen, et al. "S4: a High-sparsity, High-performance AI Accelerator", arXiv:2207.08006v1 [cs.AR], Jul. 16, 2022.

* cited by examiner

| Output/Input | B | D | F |
|---|---|---|---|
| A | Y | Y | Y |
| C | Y | N/A | Y |
| E | Y | Y | N/A |

HIERARCHICAL NETWORKS ON CHIP (NOC) FOR NEURAL NETWORK ACCELERATOR

CROSS REFERENCE TO RELATED APPLICATIONS

The present application is a continuation of U.S. patent application Ser. No. 18/197,506, filed on May 15, 2023, entitled "HIERARCHICAL NETWORKS ON CHIP (NOC) FOR NEURAL NETWORK ACCELERATOR," which is a continuation of International Application No. PCT/CN2023/086580, filed on Apr. 6, 2023, entitled "HIERARCHICAL NETWORKS ON CHIP (NOC) FOR NEURAL NETWORK ACCELERATOR." The contents of the above referenced applications are incorporated herein by reference in their entirety.

TECHNICAL FIELD

The disclosure generally relates to a hardware design for accelerating end-to-end model execution on a many-core spatial neural network accelerator with versatile workload support.

BACKGROUND

Today's neural network computations usually involve a host device (e.g., a computer managing the neural network computations) and a hardware accelerator (e.g., a hardware device for executing parts or all of the neural network computations with optimized performance). A typical hardware accelerator is implemented as a type of integrated circuit involving various components. The data and control communications among these components are usually implemented using Network-on-Chip (NoC).

End-to-end Neural Network (NN) computation involves executing various types of workloads at different levels within the hardware accelerator. These workloads are different from performance (bandwidth, throughput, and latency), cost (area and power), and flexibility (programmability, reusability, etc.) perspectives. Thus one universal NoC is unable to efficiently handle the different types of workloads. For example, conventional bus or mesh-based NoCs used in Chip Multi-Processors (CMP) or System-on-Chip (SoC) today are not appropriate for scattering or reshuffling workloads as they either limit achievable throughput or add significant area and power penalties. Customized NoCs for neural network workload are not appropriate for CMPs/SoCs purposes as well since they are not flexible enough to work with different modules in CMPs/SoCs. To address these issues, a hierarchical NoC architecture is described in this disclosure to accommodate the different types of workloads within the hardware accelerator.

SUMMARY

Various embodiments of the present specification may include hardware accelerators and devices for accelerating neural network computations by using a hierarchical NoC architecture.

In some aspects, the techniques described herein relate to a neural network (NN) accelerator with a multi-layer networks-on-chip (NoCs) architecture. The accelerator may include a plurality of cores and a central processing unit (CPU), a data exchange interface for connecting a host device to the NN accelerator, an outer-layer NoC, a middle-layer NoC, and an inner-layer NoC. Each core may include a plurality of processing entity (PE) clusters, and the plurality of cores and the CPU may be coupled to their respective memories. The outer-layer NoC may be configured to transfer data between the host device and the memories, and include a bi-directional ring-shape data link connected to the data exchange interface and the memories. The middle-layer NoC may be configured to transfer data among the plurality of cores, and include a pair of uni-directional ring-shape data links, each uni-directional ring-shape data link including a subset (e.g., a half) of the plurality of cores. The inner-layer NoC may be within each core and configured to broadcast data among the plurality of PE clusters within the core for implementing matrix operations, and include a cross-bar network connecting a global buffer of the core to the plurality of PE clusters within the core.

In some aspects, the data exchange interface includes a Peripheral Component Interconnect Express (PCIe) interface.

In some aspects, the outer-layer NoC includes a plurality of routers forming the bi-directional ring-shape data link, wherein the plurality of routers include a first router connected to the data exchange interface, a second router connected to the CPU and the corresponding memory, and multiple third routers respectively connected to the plurality of cores and the corresponding memories.

In some aspects, the outer-layer NoC has a transaction mode, in which a transaction-initiating device initiates a data transfer transaction against a target device.

In some aspects, a data transfer bandwidth of the outer-layer NoC is lower than a data transfer bandwidth of the middle-layer NoC, and the data transfer bandwidth of the middle-layer NoC is lower than a data transfer bandwidth of the inner-layer NoC.

In some aspects, the pair of uni-directional ring-shape data links in the middle-layer NoC have opposite data transferring directions.

In some aspects, the pair of uni-directional ring-shape data links include a first ring and a second ring, the cores in the first ring respectively correspond to the cores in the second ring, and each core in the first ring is connected to a corresponding core in the second ring with a bi-directional data link.

In some aspects, the middle-layer NoC has a streaming mode, in which data is transferred from a sender to a receiver.

In some aspects, the middle-layer NoC moves weights or activations of neural networks among the plurality of cores.

In some aspects, the global buffer of the core is divided into a plurality of banks respectively corresponding to the plurality of PE clusters within the core.

In some aspects, the cross-bar network in the inner-layer NoC includes a first butterfly network for broadcasting weights of a neural network from the plurality of banks to the plurality of PE clusters within the core, and a second butterfly network for broadcasting activations of the neural network from the plurality of banks to the plurality of PE clusters within the core.

In some aspects, the first butterfly network is configured to broadcast the weights of the neural network from the plurality of banks to all of the plurality of PE clusters within the core.

In some aspects, the second butterfly network is configured to broadcast the activations of the neural network from the plurality of banks to a subset of the plurality of PE clusters within the core.

In some aspects, the techniques described herein relate to a Network-on-Chip (NoC) device. The device may include a plurality of cores and a central processing unit (CPU), a data exchange interface for connecting a host device to the NN accelerator, an outer-layer NoC, a middle-layer NoC, and an inner-layer NoC. Each core includes a plurality of processing entity (PE) clusters, and the plurality of cores and the CPU are respectively coupled to memories. The outer-layer NoC includes a bi-directional ring-shape data link connected to the data exchange interface and the memories, and is configured to transfer data between the host device and the memories. The middle-layer NoC includes a pair of uni-directional ring-shape data links connecting the plurality of cores, and is configured to transfer data among the plurality of cores. The inner-layer NoC is within each core and includes a cross-bar network for broadcasting weights and activations of neural networks from a global buffer of the core to a plurality of PE clusters within the core.

In some aspects, the outer-layer NoC includes a plurality of routers forming the bi-directional ring-shape data link, wherein the plurality of routers include a first router connected to the data exchange interface, a second router connected to the CPU and the corresponding memory, and multiple third routers respectively connected to the plurality of cores and the corresponding memories.

In some aspects, a data transfer bandwidth of the outer-layer NoC is lower than a data transfer bandwidth of the middle-layer NoC, and the data transfer bandwidth of the middle-layer NoC is lower than a data transfer bandwidth of the inner-layer NoC.

In some aspects, the pair of uni-directional ring-shape data links in the middle-layer NoC have opposite data transferring directions, and each of the pair of uni-directional ring-shape data links includes a subset (e.g., a half) of the plurality of cores.

In some aspects, the pair of uni-directional ring-shape data links includes a first ring and a second ring, the cores in the first ring respectively correspond to the cores in the second ring, and each core in the first ring is connected to a corresponding core in the second ring with a bi-directional data link.

In some aspects, the global buffer of the core is divided into a plurality of banks respectively corresponding to the plurality of PE clusters within the core.

In some aspects, the cross-bar network in the inner-layer NoC includes a first butterfly network for broadcasting weights of a neural network from the plurality of banks to the plurality of PE clusters within the core, and a second butterfly network for broadcasting activations of the neural network from the plurality of banks to the plurality of PE clusters within the core.

These and other features of the systems, methods, and non-transitory computer-readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

DETAILED DESCRIPTION

Embodiments described herein provide hardware devices and accelerators with a hierarchical Network-on-Chip (NoC) architecture to facilitate different types of data exchanges among different components.

In the following description, specific, non-limiting embodiments of the present invention will be described with reference to the drawings. Particular features and aspects of any embodiment disclosed herein may be used and/or combined with particular features and aspects of any other embodiment disclosed herein. It should also be understood that such embodiments are by way of example and are merely illustrative of a small number of embodiments within the scope of the present invention. Various changes and modifications obvious to one skilled in the art to which the present invention pertains are deemed to be within the spirit, scope, and contemplation of the present invention as further defined in the appended claims.

Figure 1A:
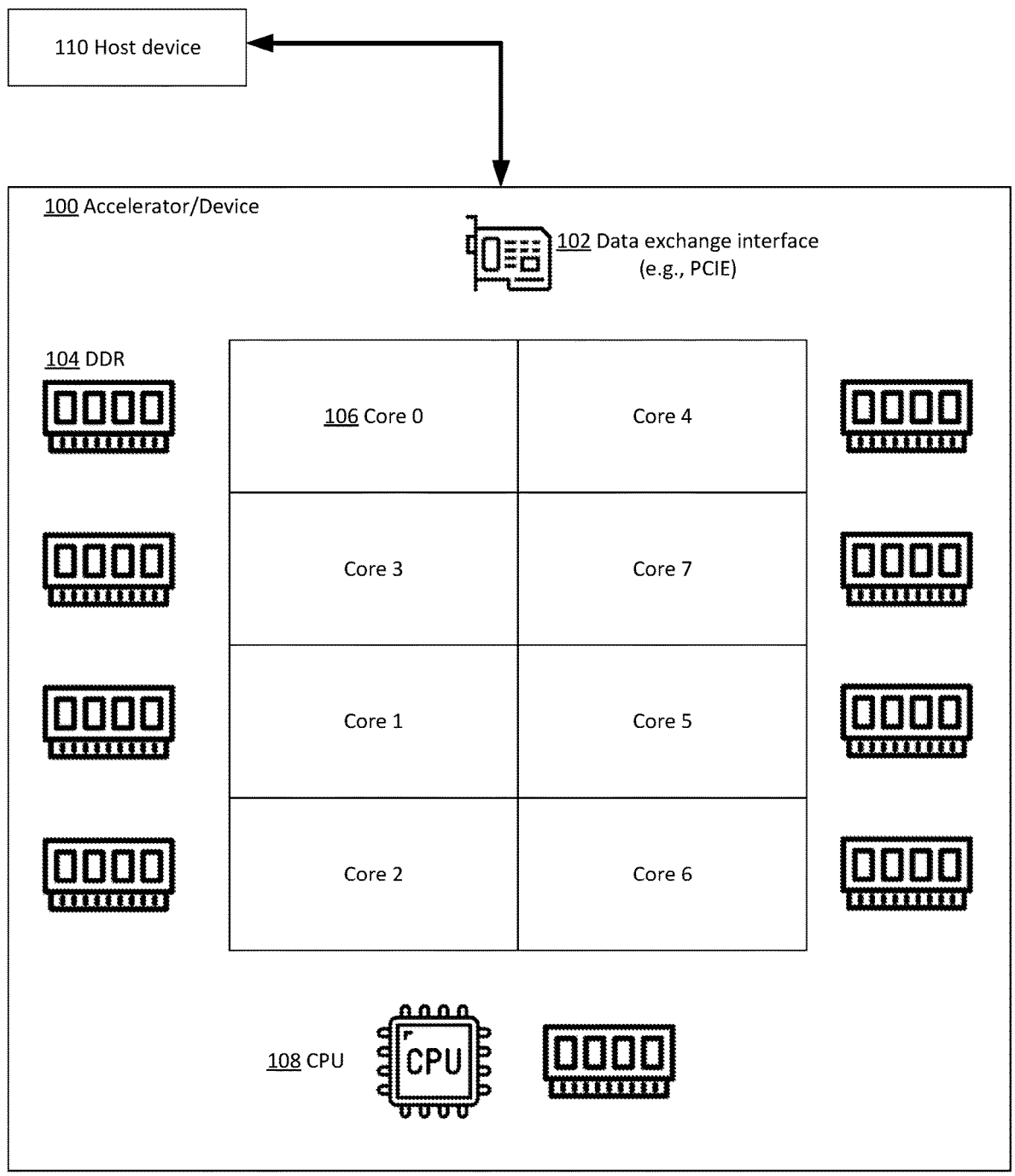
FIG. 1A illustrates an exemplary diagram of a hardware accelerator for neural network computations in accordance with various embodiments.

FIG. 1A illustrates an exemplary diagram of a hardware accelerator 100 for neural network computations in accordance with various embodiments. The accelerator 100 in FIG. 1A is configurable to perform common neural network computations such as convolution computations and vector operations using the same hardware components. FIG. 1A illustrates some hardware components in the accelerator 100, such as a plurality of neural network (NN) cores 106 (FIG. 1A illustrates 8 NN cores), a processing unit (FIG. 1A illustrates a CPU as an example, which may be replaced with another type of processor), memories (e.g., Double Data Rate (DDRs)), a data exchange interface connecting the accelerator 100 with a host device 110. Depending on the implementation, the accelerator 100 may include additional components such as data pre-processing circuit and post-processing circuit to perform parts of the neural network computations.

In a typical setup, the host device 110, such as a computer or a mobile device, runs a neural network software and manages the overall computation process, while the accelerator 100, such as a specialized hardware device implemented as an Application-Specific Integrated Circuit (ASIC) or a Field-Programmable Gate Array (FPGA), helps to accelerate the computation of the neural network by performing complex mathematical operations at a much faster rate than the host device. In some embodiments, the data exchange between the host device 110 and the accelerator 100 may be through a Peripheral Component Interconnect Express (PCIe).

Figure 1B:
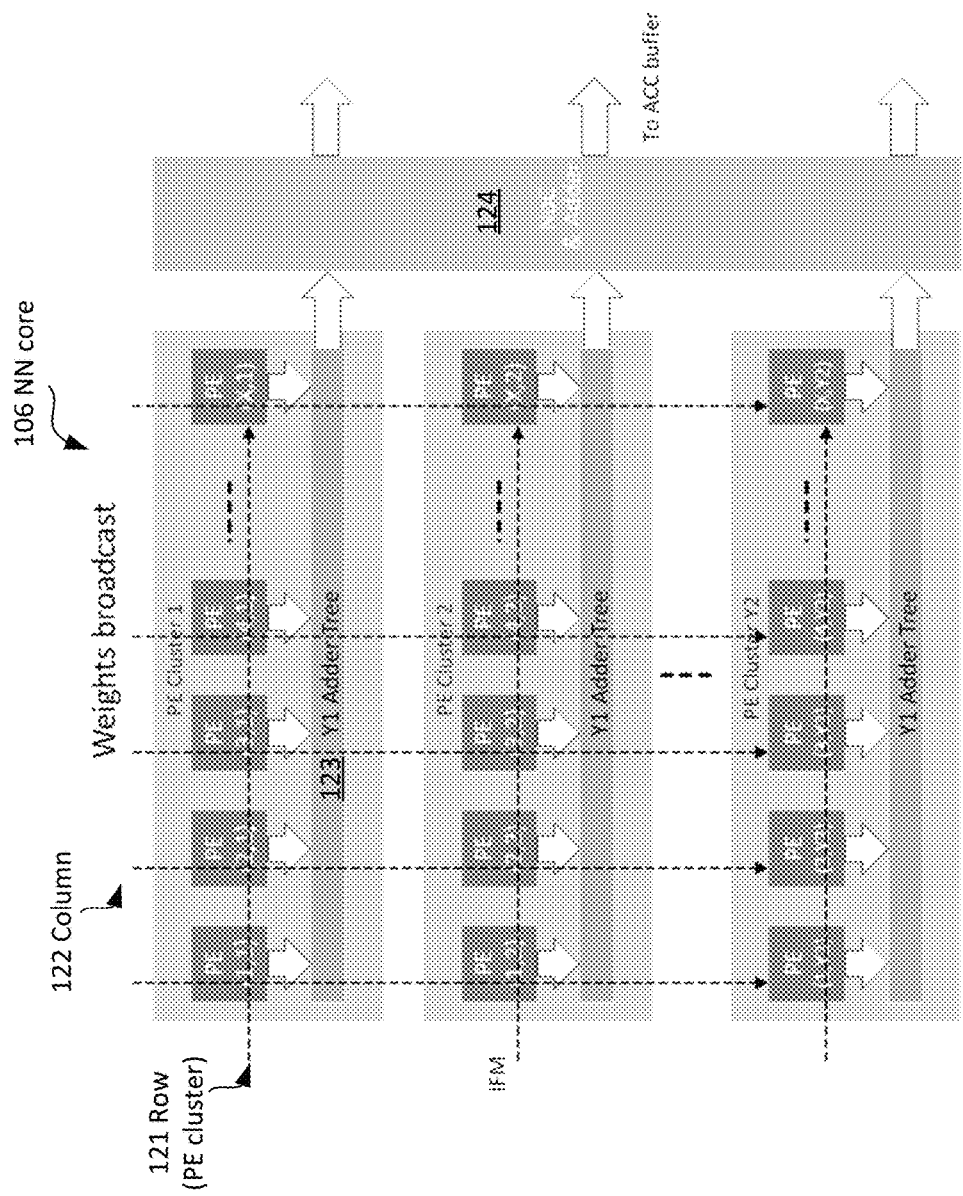
FIG. 1B illustrates an exemplary architecture of an NN core in accordance with various embodiments.

In some embodiments, each of the NN cores 106 in the accelerator 100 may include a plurality of processing entities (PEs) arranged in clusters. Referring to FIG. 1B for an exemplary architecture of an NN core 106. Note the arrangement of the PEs in the NN core 106 in FIG. 1B is for illustrative purposes and may be implemented in other ways depending on the use case.

As shown on the left portion of FIG. 1A, the NN core 106 may include a matrix of PEs. Each PE may include a plurality of multipliers (MUL gates). The multipliers within each PE may work in parallel, and the PEs within the NN core 106 may work in parallel. In FIG. 1B, the number of columns 122 of PEs in the NN core 106 is denoted as X, the number of rows 121 of PEs in the NN core 106 is denoted as Y2, and the number of multipliers within each PE is denoted as Y1. Each row 121 of PEs may be referred to as a PE cluster, and each PE cluster may be coupled to Y1 Adder-trees 123 for aggregating the partial sums generated by the multipliers within the PE cluster. The aggregation results from the Adder-trees 123 across all PE clusters (total Y1×Y2 Adder-trees) may be fed into an Adder 124 for aggregation. The adder 124 may refer to a digital circuit performing the addition of numbers.

Referring back to FIG. 1A, the data movement during neural network computations in the accelerator 100 may occur at three levels.

At the highest level, the host device 110 may send data to the accelerator 100 and obtain certain outputs from the accelerator 110. The data from the host device 110 may be stored in the DDRs 104 (or other types of memories) coupled to the NN cores, and the accelerator 110 may retrieve data from the DDRs 104 and return them to the host device 110.

At the intermediate level, the plurality of NN cores 106 may need to exchange data as part of the computations. For instance, when a neural network processes a large image (e.g., an 8K image), the data (e.g., pixels) is too large to fit in any local DDRs of the NN cores. A common way is to segment the image into small pieces and distribute them among the local DDRs of the NN cores for parallel processing. During the subsequent matrix operations (e.g., convolutions), all weights may be needed for the computation, and thus each core may need to broadcast its local data to some other cores.

At the lowest level, the plurality of PE clusters within each NN core may exchange data. For example, when performing convolution operations using a large filter matrix (e.g., 3*3 or 5*5) and a smaller stride, multiple neighboring PE clusters may have overlapping data to process. In these cases, one PE cluster may broadcast its data to its neighboring PE clusters.

This disclosure describes a hierarchical NoC architecture to implement the data movements at different levels. The goals of the hierarchical NoC architecture include achieving the shortest routing for each data movement and supporting the maximum number of parallel data movements.

Figure 2:
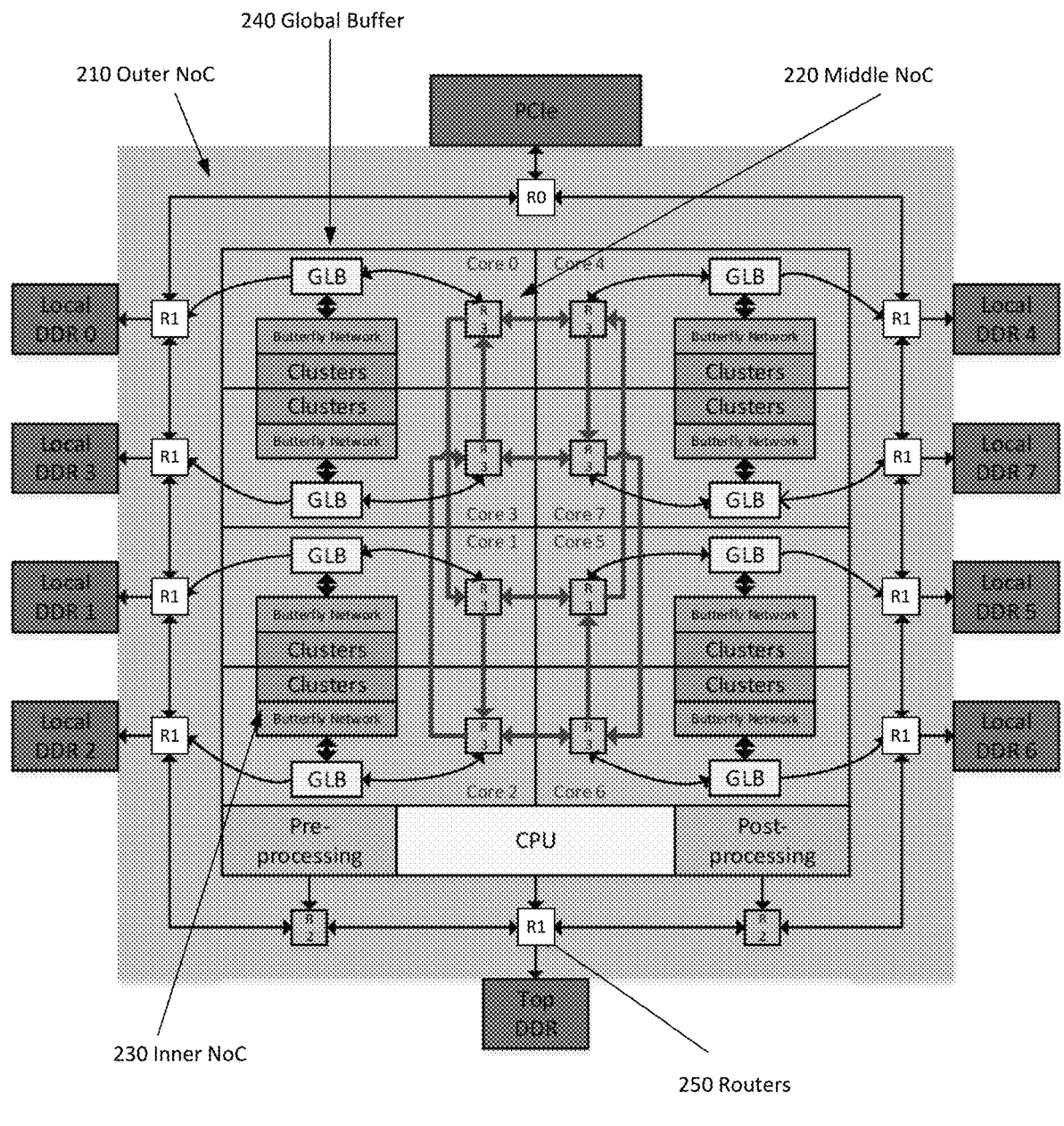
FIG. 2 illustrates an exemplary architectural diagram of a hierarchical NoC within a hardware accelerator, in accordance with various embodiments.

FIG. 2 illustrates an exemplary architectural diagram of a hierarchical NoC within a hardware accelerator 200, in accordance with various embodiments. The accelerator 200 maps to the accelerator 100 in FIG. 1A and includes more details for ease of description. For instance, each NN core in FIG. 2 includes a global buffer (GLB) shared by the PE clusters therein. The DDRs coupled with the NN cores are labeled as local DDRs, and the DDR coupled with the CPU is labeled as a top DDR. Here, the DDR memory coupled to a core or CPU refers to a dedicated memory that is accessible only by the coupled core or CPU.

The accelerator 200 may also include a pre-processing circuit and a post-processing circuit to assist the CPU to perform data pre-processing and post-processing as part of the neural network computation. Some pre-processing tasks may include normalization (scaling the input data so that it has a mean of 0 and/or a standard deviation of 1), feature scaling (scaling the input data so that all the features are on a similar scale), and one-hot encoding (converting categorical data, such as labels, into a format that can be understood by the neural network). Some post-processing tasks may include denormalization (reversing the normalization process by multiplying the data by the standard deviation and adding the mean), inverse feature scaling (reversing the feature scaling process by multiplying each feature by its maximum value), and converting one-hot encoded data back to its original format.

In some embodiments, the hardware accelerator 200 includes a hierarchical NoC architecture with multiple levels of NoCs, with each level of NoC being optimized for the workload/data movement occurring at a specific level. Using the accelerator 200 in FIG. 2 as an example, the data movements may occur (1) between the host device and the NN cores in the accelerator, (2) among the NN cores, and (3) inside each NN core (among the PE clusters within the NN core). The workloads at these different levels exhibit different patterns and thus demand different NoC designs.

In some embodiments, the hierarchical NoC architecture in the accelerator 200 may include three layers of NoCs: an outer-layer NoC 210, a middle-layer NoC 220, and an inner-layer NoC 230.

The outer-layer NoC 210 may be configured to transfer data between a host device (e.g., the host device 110 in FIG. 1A) and the DDRs associated with cores and the CPU inside the accelerator 200 through the data exchange interface (e.g., PCIe in FIG. 2). The outer-layer NoC 210 may be a bi-directional ring-shape data link connected by routers labeled R0, R1, and R2 in FIG. 2. In an example, the R1 routers each include four ports: one connected to an NN core (or the CPU), one connected to the DDR corresponding to the NN core (or the CPU), and the other two connected to two neighboring routers on the ring-shape data link. The R2 routers each include three ports: one connected to the pre-processing or post-processing circuits, and the other two connected to two neighboring routers on the ring-shape data link. The R0 router includes three ports: one connected to the PCIe interface, and the other two connected to two neighboring routers on the ring-shape data link.

In some embodiments, the data can move in both directions in the outer-layer NoC, and the outer-layer NoC works in a transaction mode. In the transaction mode, a hardware component may be a transaction initiator that initiates a data write request or a data read request. For instance, the PCIe may be an initiator that reads from or writes to one or more of the DDRs associated with the NN cores. Making the outer-layer NoC support transaction mode is because the data movement among the host device, the NN cores, and the CPU is more diversified than the inner layers (e.g., the inner layers may require to support more limited data movements such as split and broadcast, but the data movement at the outer layer can be between any two components and in any direction).

Figure 3:
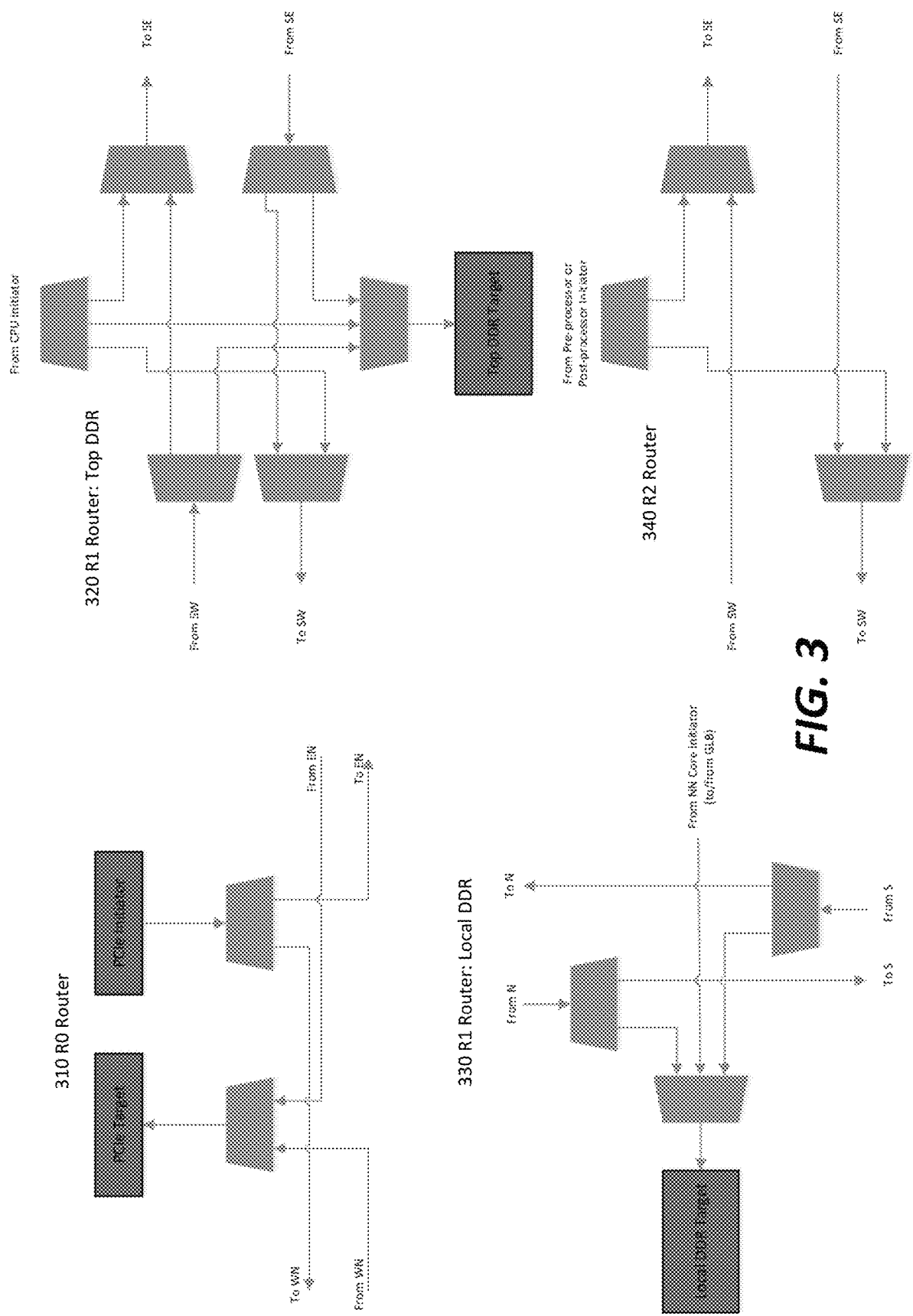
FIG. 3 illustrates exemplary diagrams for routing data in an outer-layer NoC in a hardware accelerator, in accordance with various embodiments.

The description temporarily shifts from FIG. 2 to FIG. 3 to illustrate how data is being routed in the outer-layer NoC 210 at different routers. For example, at R0 router 310 (connecting to the PCIe to the cores and CPU), the PCIe may be a data movement transaction initiator when the host device writes data into the accelerator, and it may also be a data movement transaction target when data is pushed from the accelerator to the host device in a Direct Memory Access (DMA) fashion (e.g., WN stands for west-north or the direction towards the right half of the outer-layer NoC 210 in FIG. 2, and EN stands for east-north or the direction towards the left half of the outer-layer NoC 210 in FIG. 2). As another example, at R1 router 320 connecting the CPU and the top DDR to the outer-layer NoC 210, the CPU may be an initiator (e.g., reader or writer) and the top DDR may be a target (e.g., providing or receiving data). And the R1 router 320 allows sending and receiving data from both directions of the outer-layer NoC 210. As yet another example, at R1 router 330 connecting a NN core and its local DDR to the outer-layer NoC 210, the local DDR may be a target (e.g., providing and receiving data), and the NN core may be an initiator (e.g., reader or writer). As yet another example, at R2 router 340 connecting the pre-processing or post-processing circuit to the outer-layer NoC 210, the pre-processing or post-processing circuit may be the initiator to read and write data from both directions of the outer-layer NoC 210.

Referring back to FIG. 2, the middle-layer NoC 220 may be configured to transfer data among the plurality of NN cores in the accelerator 200 (e.g., 8 NN cores (core 0 to core 8) in FIG. 2). In some embodiments, the middle-layer NoC 220 includes a plurality of uni-directional ring-shape data links, and each uni-directional ring-shape data link links a subset of the cores. In the case of the accelerator 200, the 8 cores may be divided into two groups of 4 cores, and the cores in each group are connected with a uni-directional ring-shape data link. The two uni-directional ring-shape data links may be in opposite directions. The cores in one uni-directional ring-shape data link respectively correspond to the cores in the other uni-directional ring-shape data link. The corresponding cores are then connected with bi-directional data links.

Figure 4A:
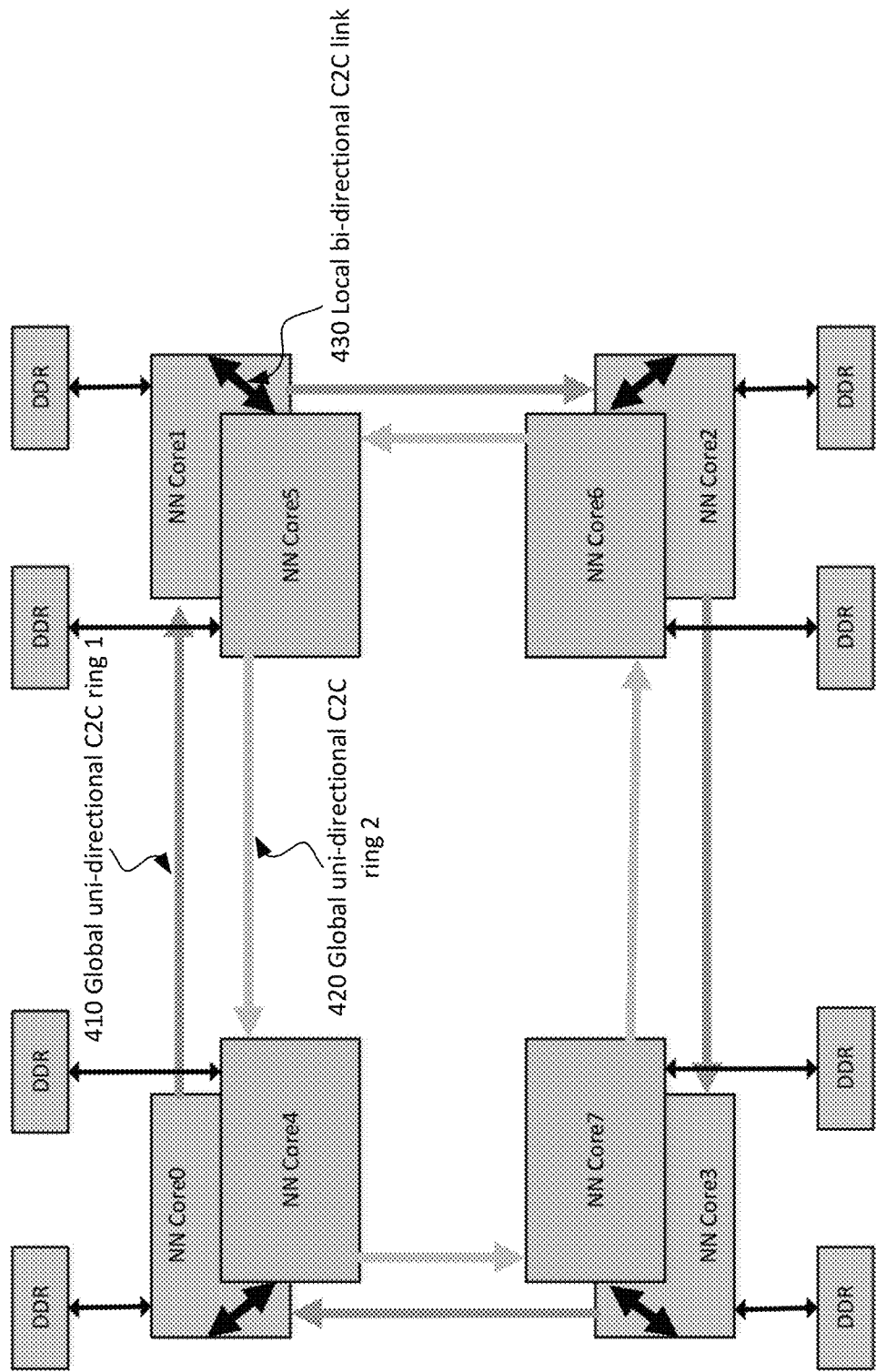
FIG. 4A illustrates an exemplary middle-layer NoC in a hardware accelerator, in accordance with various embodiments.

An example configuration of the middle-layer NoC in the accelerator 200 is illustrated in FIG. 4A, in which cores 0-3 are connected by the global uni-directional core-to-core (C2C) ring 410 (the clock-wise ring), and cores 4-7 are connected by the global uni-directional C2C ring 420 (the counter clock-wise ring). The cores 0-3 respectively correspond to cores 4-7, and each pair of the corresponding cores (e.g., core 1 and core 5) are connected with a local bi-directional C2C link 430. Different from the transaction mode of the outer-layer NoC 210, the middle-layer NoC works in a streaming mode, in which data is transferred from a sender to a receiver. The streaming mode does not require the semantics for initiating a transaction (e.g., in transaction mode) to define the target or confirm the delivery of the data. The reason behind this design is that the cores in the accelerator may need to cast (e.g., by unicasting, multicasting, or broadcasting) their local data to other cores at a fast speed, which is more efficient with shorter routings and less congested data paths. Various routing configurations and examples are further illustrated in FIGS. 4B and 4C.

Figure 4B:
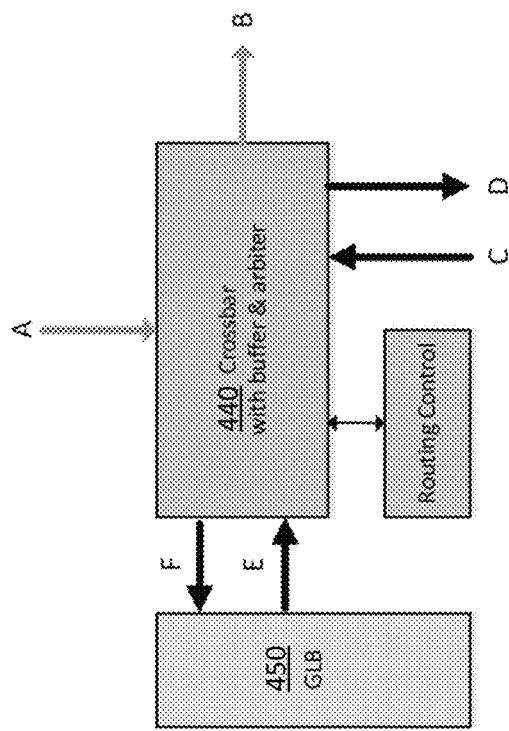
FIG. 4B illustrates an exemplary routing table for a middle-layer NoC in a hardware accelerator, in accordance with various embodiments.

Referring to FIG. 4B, an NN core may be associated with a router 440 (e.g., a crossbar with buffer and arbiter) in order to participate in a middle-layer NoC. The router 440 may have two ports (e.g., A and B) used for the global uni-directional ring-shape C2C link in which the NN core is located. The router 440 may also have ports, e.g., C and D, to support the local bi-directional C2C link connecting the NN core to its corresponding NN core in the other global uni-directional ring-shape C2C link. The router 440 may further have ports, e.g., E and F, to read from and write to a global buffer (GLB) 450 associated with the NN core. With these ports, the routing table in FIG. 4B shows possible routing options for different inputs. For instance, if data is received from port A (e.g., data from another NN core on the same ring), it may be output to ports B, D, and F, according to the routing control logic. If data is received from port C (e.g., from the corresponding NN core from the opposite ring), it may be output to ports B and F, but not D. If data is received from port E (e.g., read from its associated GLB), it may be output to ports B and D, but not F. These logics may be programmed into the routing control module to prevent data from flowing back to the source (e.g., data from port C should not be allowed to output to port D).

Figure 4C:
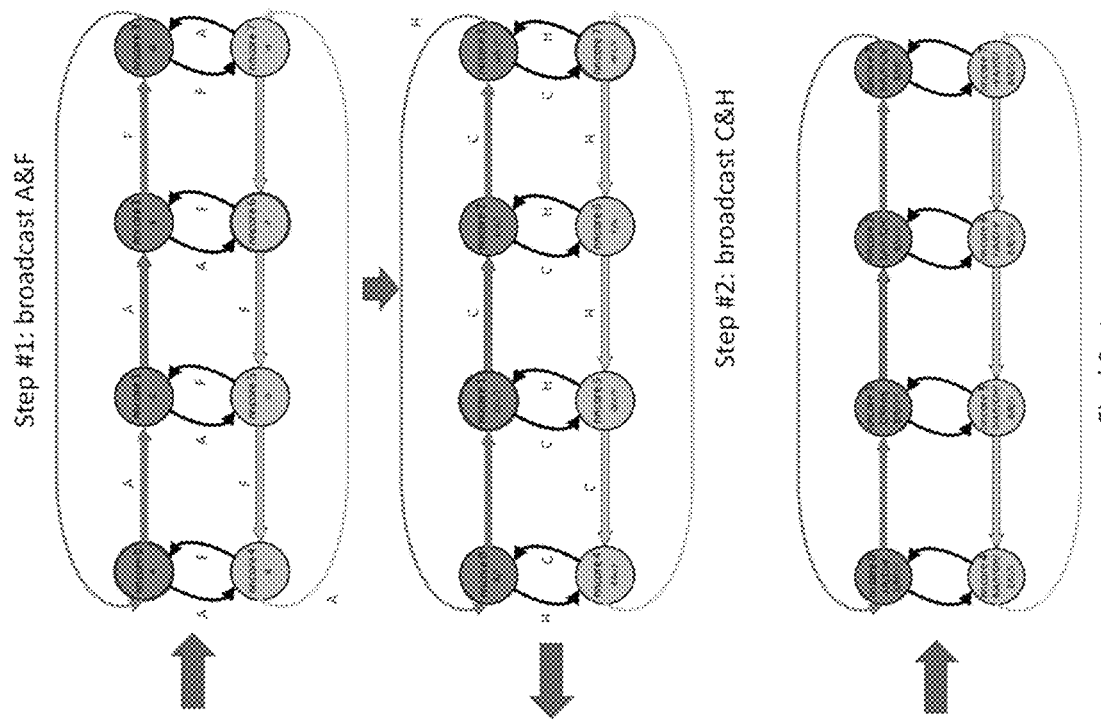
FIG. 4C illustrates an exemplary data broadcasting among neural network cores (NN cores) using a middle-layer NoC in a hardware accelerator, in accordance with various embodiments.
Figure 4C:
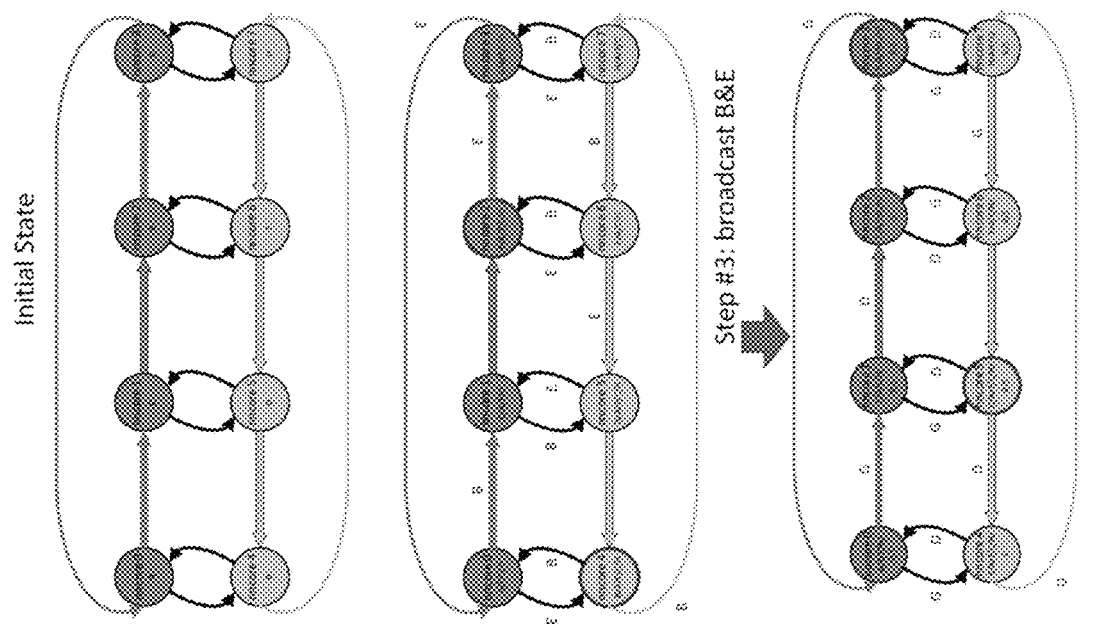
Figure 4C:
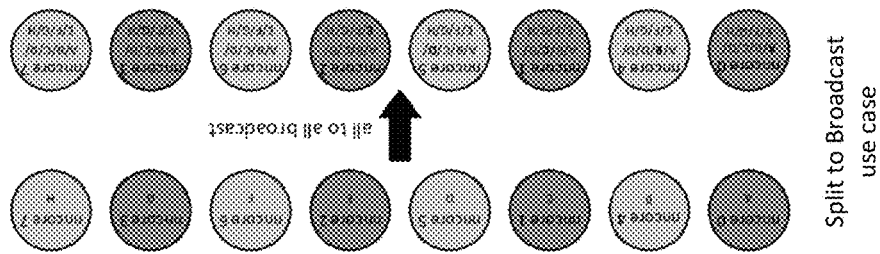

Referring to FIG. 4C, a specific "split to broadcast" data movement among the NN cores inside an accelerator is illustrated. This type of data movement may occur when the neural network computation needs to split weights or activations and broadcast the weights and activations. Each NN core may initially host its portion of the weights or activations, and the goal of the movement is to broadcast all weights or activations to all NN cores. As shown, the process may start with an initial state in which each core only hosts its own data. At step 1, core 0 and core 6 may concurrently broadcast their own data to all other cores. At step 2, core 1 and core 7 may concurrently broadcast their own data to all other cores. At step 3, core 2 and core 4 may concurrently broadcast their own data to all other cores. At step 4, core 3 and core 5 may concurrently broadcast their own data to all other cores. After step 4, the broadcast is complete. As this example shows, the two-ring configuration in the middle-layer NoC allows two cores to broadcast at the same time and without sharing any of the data paths at any given time, which maximizes the utility efficiency of the data links.

Now referring back to FIG. 2, the inner-layer NoC 230 is configured within each NN core to cast (e.g., broadcast, multicast, or unicast) data among the plurality of PEs clusters within the core for implementing matrix operations. In some embodiments, the inner-layer NoC 230 may include a cross-bar network connecting a global buffer of the core to the plurality of PE clusters within the core. The cross-bar network may include multiple butterfly networks for performing different types of broadcasting on different types of data (e.g., one-to-all broadcasting or one-to-neighboring PE cluster broadcasting). More details on the inner-layer NoC 230 are illustrated in FIG. 5.

In terms of the bandwidth for data transmission, the inner-layer NoC 230 handles the most frequent data movements and thus has the highest bandwidth. The frequency of data movement at the outer-layer NoC 210 may be the lowest so it has the lowest bandwidth among all the layers. The inner-layer NoC 230 achieves the highest bandwidth by providing direct links from the source (e.g., a global buffer of a NN core) and the target (e.g., PE clusters within the NN core).

Figure 5:
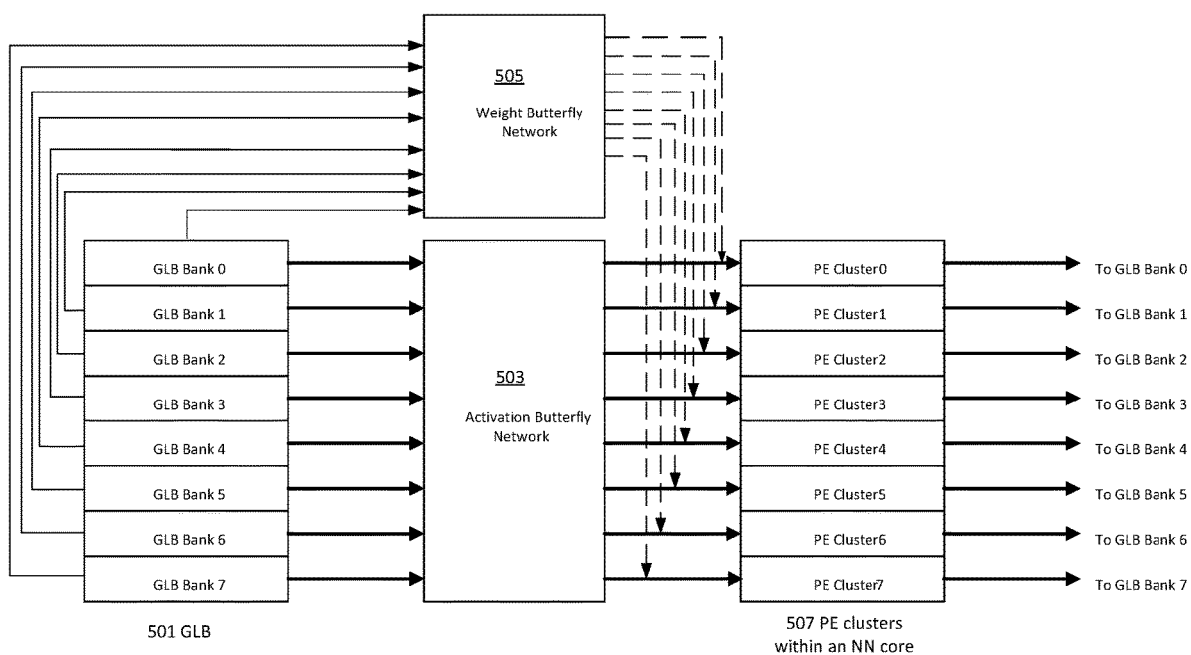
FIG. 5 illustrates an exemplary inner-layer NoC in a hardware accelerator, in accordance with various embodiments.

FIG. 5 illustrates an exemplary inner-layer NoC in a hardware accelerator, in accordance with various embodiments. As described above, each NN core in a many-core neural network accelerator may include a plurality of PE clusters 507 for parallel processing and a global buffer 501. The global buffer (GLB) 501 may be divided into multiple banks respectively corresponding to the clusters of PEs. The GLB 501 may store weights or activations and broadcast them to the PE clusters for computation. The output of the computation from the PE clusters may be stored back to the corresponding banks in the GLB 501.

In some embodiments, the inner-layer NoC may include two butterfly networks: a weight butterfly network 505 and an activation butterfly network 503. Here, a butterfly network refers to a multi-stage interconnection structure containing a plurality of switches to facilitate various data castings such as data broadcasting, unicasting, multicasting, reshuffle, etc. The weight butterfly network 505 is activated when the GLB 501 needs to broadcast or unicast weights onto the PE clusters, and the activation butterfly network 503 may be activated when the GLB 501 needs to broadcast, unicast, or Image to Column (Im2col) activations onto the PE clusters. Here, Im2col involves converting image data into a 2D matrix representation, where each column of the matrix corresponds to a contiguous region (i.e., a "patch") of the original image. This representation allows the application of linear operations such as matrix multiplications, which optimizes techniques such as convolutional neural networks (CNNs). The im2col operation may be used as a preprocessing step before feeding the data into a CNN, as it enables the use of highly optimized matrix operations to efficiently process the image data.

In some embodiments, the weight butterfly network 505 supports one-to-all broadcasting, in which the weights from each GLB bank is broadcasted onto all PE clusters. In some embodiments, the activation butterfly network 503 supports one-to-neighboring PE cluster multicasting, in which the activations from each GLB bank are broadcasted to its corresponding PE cluster(s) and neighboring PE clusters. For example, the activations from GLB bank 3 are broadcasted through the activation butterfly network 503 onto PE cluster 3 as well as PE clusters 2 and 4. The number of neighboring PE clusters to broadcast to may be configurable based on the computation requirement. In other embodiments, the weight butterfly network 505 may also support one-to-one casting, i.e., unicasting.

Figure 6:
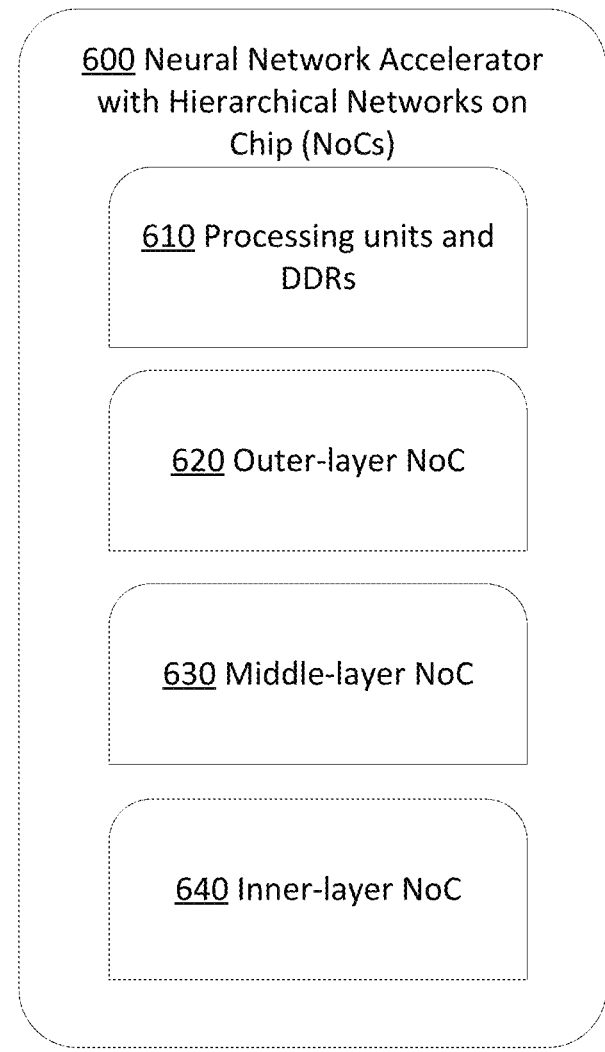
FIG. 6 illustrates an exemplary system design of a hardware accelerator with a hierarchical NoC architecture, in accordance with various embodiments.

FIG. 6 illustrates an exemplary system design of a hardware accelerator 600 with a hierarchical NoC architecture, in accordance with various embodiments. The accelerator 600 may be used by a host device to speed up neural network computation speed. In particular, the hierarchical NoCs within the accelerator 600 includes multiple layers of NoCs that are specifically optimized for the different data movement patterns at different hardware levels.

In some embodiments, the accelerator 600 may include a plurality of processing units 610 that are coupled with memories (e.g., DDRs), a data exchange interface for connecting a host device to the NN accelerator 600, an outer-layer NoC 620, a middle-layer NoC 630, and an inner-layer NoC 640. The plurality of processing units 610 may include a plurality of NN cores and a CPU. Each NN core may include a plurality of processing entity (PE) clusters. The outer-layer NoC may be configured to transfer data between the host device and the memories, and include a bi-directional ring-shape data link connected to the data exchange interface and the memories. The middle-layer NoC may be configured to transfer data among the plurality of cores, and include a pair of uni-directional ring-shape data links, each uni-directional ring-shape data link comprising a subset (e.g., a half) of the plurality of cores. The inner-layer NoC may be within each core and configured to broadcast data among the plurality of PE clusters within the core for implementing matrix operations, and include a cross-bar network connecting a global buffer of the core to the plurality of PE clusters within the core.

Figure 7:
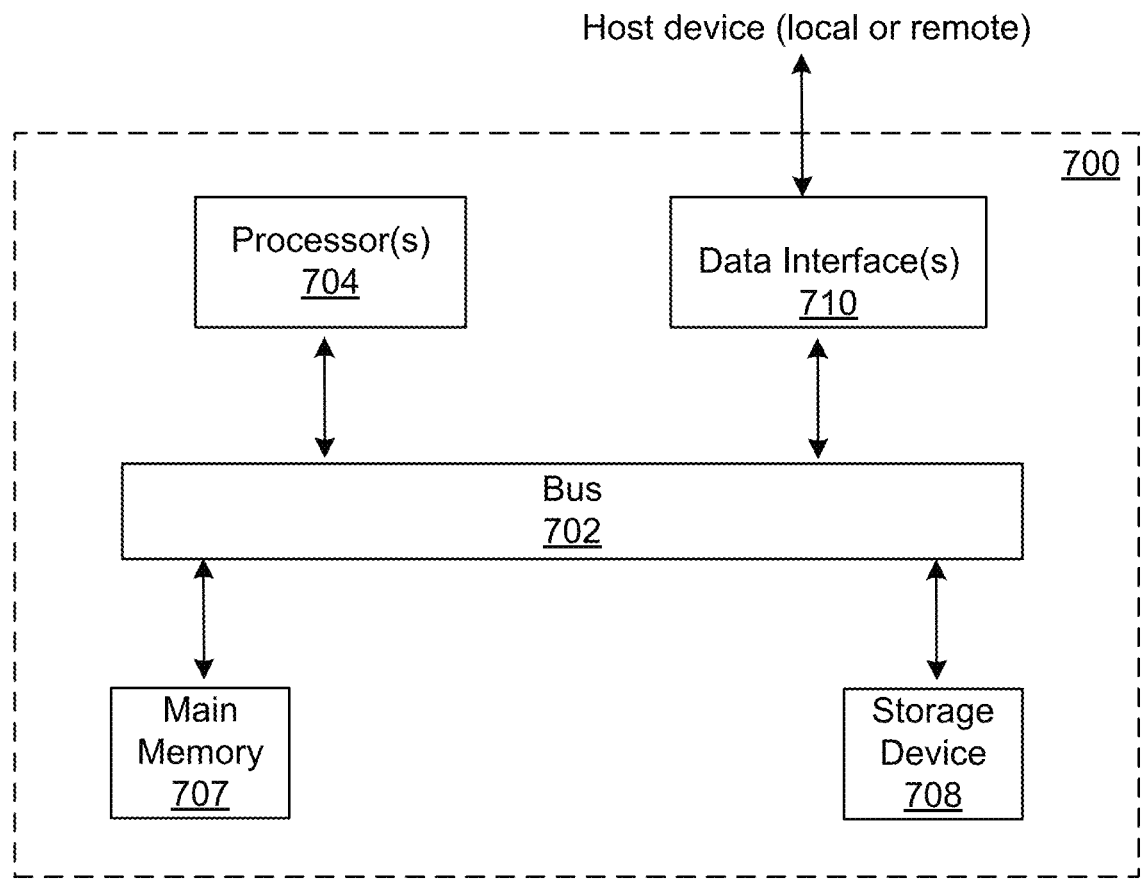
FIG. 7 illustrates an example computer system in which any of the embodiments described herein may be implemented.

FIG. 7 illustrates an exemplary computing device of a hardware accelerator with a hierarchical NoC architecture, in accordance with various embodiments. The computing device may be used to implement one or more components of the systems and the methods shown in FIGS. 1-6. The computing device 700 may comprise a bus 702 or other communication mechanisms for communicating information and one or more hardware processors 704 coupled with bus 702 for processing information. Hardware processor(s) 704 may be, for example, one or more general-purpose microprocessors.

The computing device 700 may also include a main memory 707, such as random-access memory (RAM), cache and/or other dynamic storage devices, coupled to bus 702 for storing information and instructions to be executed by processor(s) 704. Main memory 707 also may be used for storing temporary variables or other intermediate information during execution of instructions to be executed by processor(s) 704. Such instructions, when stored in storage media accessible to processor(s) 704, may render computing device 700 into a special-purpose machine that is customized to perform the operations specified in the instructions. Main memory 707 may include non-volatile media and/or volatile media. Non-volatile media may include, for example, optical or magnetic disks. Volatile media may include dynamic memory. Common forms of media may include, for example, a floppy disk, a flexible disk, hard disk, solid-state drive, magnetic tape, or any other magnetic data storage medium, a CD-ROM, any other optical data storage medium, any physical medium with patterns of holes, a RAM, a DRAM, a PROM, and EPROM, a FLASH-EPROM, an NVRAM, any other memory chip or cartridge, or networked versions of the same.

The computing device 700 may implement the techniques described herein using customized hard-wired logic, one or more ASICs or FPGAs, firmware and/or program logic which in combination with the computing device may cause or program computing device 700 to be a special-purpose machine. According to one embodiment, the techniques herein are performed by computing device 700 in response to processor(s) 704 executing one or more sequences of one or more instructions contained in main memory 707. Such instructions may be read into main memory 707 from another storage medium, such as storage device 708. Execution of the sequences of instructions contained in main memory 707 may cause processor(s) 704 to perform the process steps described herein. For example, the processes/methods disclosed herein may be implemented by computer program instructions stored in main memory 707. When these instructions are executed by processor(s) 704, they may perform the steps as shown in corresponding figures and described above. In alternative embodiments, hardwired circuit may be used in place of or in combination with software instructions.

The computing device 700 also includes a communication interface 710 coupled to bus 702. Communication interface 710 may provide a two-way data communication coupling to one or more network links that are connected to one or more networks. As another example, communication interface 710 may be a PCIe card to provide a data communication connection to a local host device, or a local area network (LAN) card to provide a data communication connection to a remote host device.

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Each of the processes, methods, and algorithms described in the preceding sections may be embodied in, and fully or partially automated by, code modules executed by one or more computer systems or computer processors comprising computer hardware. The processes and algorithms may be implemented partially or wholly in an application-specific circuit.

When the functions disclosed herein are implemented in the form of software functional units and sold or used as independent products, they can be stored in a processor executable non-volatile computer-readable storage medium. Particular technical solutions disclosed herein (in whole or in part) or aspects that contribute to current technologies may be embodied in the form of a software product. The software product may be stored in a storage medium, comprising a number of instructions to cause a computing device (which may be a personal computer, a server, a network device, and the like) to execute all or some steps of the methods of the embodiments of the present application. The storage medium may comprise a flash drive, a portable hard drive, a ROM, a RAM, a magnetic disk, an optical disc, another medium operable to store program code, or any combination thereof.

Particular embodiments further provide a system comprising a processor and a non-transitory computer-readable storage medium storing instructions executable by the processor to cause the system to perform operations corresponding to steps in any method of the embodiments disclosed above. Particular embodiments further provide a non-transitory computer-readable storage medium configured with instructions executable by one or more processors to cause the one or more processors to perform operations corresponding to steps in any method of the embodiments disclosed above.

Embodiments disclosed herein may be implemented through a cloud platform, a server or a server group (hereinafter collectively the "service system") that interacts with a client. The client may be a terminal device, or a client registered by a user at a platform, wherein the terminal device may be a mobile terminal, a personal computer (PC), or any device that may be installed with a platform application program.

The various features and processes described above may be used independently of one another or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The exemplary systems and components described herein may be configured differently than described. For example, elements may be added to, removed from, or rearranged compared to the disclosed example embodiments.

The various operations of exemplary methods described herein may be performed, at least partially, by an algorithm. The algorithm may be comprised in program codes or instructions stored in a memory (e.g., a non-transitory computer-readable storage medium described above). Such algorithm may comprise a machine learning algorithm. In some embodiments, a machine-learning algorithm may not explicitly program computers to perform a function but can learn from training samples to make a prediction model that performs the function.

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein, "or" is inclusive and not exclusive, unless expressly indicated otherwise or indicated otherwise by context. Therefore, herein, "A, B, or C" means "A, B, A and B, A and C, B and C, or A, B, and C," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The term "include" or "comprise" is used to indicate the existence of the subsequently declared features, but it does not exclude the addition of other features. Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

What is claimed is:

1. A neural network (NN) accelerator with a multi-layer networks-on-chip (NoCs) architecture, comprising:
   a plurality of cores and a central processing unit (CPU), wherein each core comprises a plurality of processing entity (PE) clusters, and the plurality of cores and the CPU are respectively coupled to memories, and
   a data exchange interface connecting a host device to the NN accelerator,
   an outer-layer NoC,
   a middle-layer NoC, and
   an inner-layer NoC,
   wherein:
   the outer-layer NoC is configured to transfer data between the host device and the memories, and comprises a plurality of routers forming a bi-directional ring-shape data link, wherein the plurality of routers comprise a first router connected to the data exchange interface, a second router connected to the CPU and the corresponding memory, and multiple third routers respectively connected to the plurality of cores and the corresponding memories,
   the middle-layer NoC is configured to transfer data among the plurality of cores; and
   the inner-layer NoC is within each core and configured to perform data casting among the plurality of PE clusters within the core for implementing matrix operations.

2. The NN accelerator of claim 1, wherein the data exchange interface comprises a Peripheral Component Interconnect Express (PCIe) interface.

3. The NN accelerator of claim 1, wherein the bi-directional ring-shape data link connected to the data exchange interface and the memories.

4. The NN accelerator of claim 1, wherein the outer-layer NoC has a transaction mode, in which a transaction-initiating device initiates a data transfer transaction against a target device.

5. The NN accelerator of claim 1, wherein the middle-layer NoC comprises a pair of uni-directional ring-shape data links, each uni-directional ring-shape data link comprising a subset of the plurality of cores.

6. The NN accelerator of claim 5, wherein the pair of uni-directional ring-shape data links in the middle-layer NoC have opposite data transferring directions.

7. The NN accelerator of claim 5, wherein the pair of uni-directional ring-shape data links comprise a first ring and a second ring, the cores in the first ring respectively correspond to the cores in the second ring, and
   each core in the first ring is connected to a corresponding core in the second ring with a bi-directional data link.

8. The NN accelerator of claim 1, wherein the middle-layer NoC has a streaming mode, in which data is transferred from a sender to a receiver.

9. The NN accelerator of claim 1, wherein the middle-layer NoC moves weights or activations of neural networks among the plurality of cores.

10. The NN accelerator of claim 1, wherein the inner-layer NoC comprises a cross-bar network connecting a global buffer of the core to the plurality of PE clusters within the core, and the global buffer of the core is divided into a plurality of banks respectively corresponding to the plurality of PE clusters within the core.

11. The NN accelerator of claim 10, wherein the cross-bar network in the inner-layer NoC comprises a first butterfly network for casting weights of a neural network from the plurality of banks to the plurality of PE clusters within the core, and a second butterfly network for casting activations of the neural network from the plurality of banks to the plurality of PE clusters within the core.

12. The NN accelerator of claim 11, wherein the first butterfly network is configured to broadcast or unicast the weights of the neural network from the plurality of banks to all of the plurality of PE clusters within the core.

13. The NN accelerator of claim 11, wherein the second butterfly network is configured to broadcast or unicast the activations of the neural network from the plurality of banks to a subset of the plurality of PE clusters within the core.

14. A Network-on-Chip (NoC) device, comprising:
a plurality of cores and a central processing unit (CPU), wherein each core comprises a plurality of processing entity (PE) clusters, and the plurality of cores and the CPU are respectively coupled to memories,
a data exchange interface for connecting to a host device,
an outer-layer NoC,
a middle-layer NoC, and
an inner-layer NoC,
wherein:
the outer-layer NoC comprises a bi-directional ring-shape data link connected to the data exchange interface and the memories,
the middle-layer NoC comprises a pair of uni-directional ring-shape data links connecting the plurality of cores; and
the inner-layer NoC is within each core and configured to perform data casting among the plurality of PE clusters within the core for implementing matrix operations.

15. The NoC device of claim 14, wherein the outer-layer NoC comprises a plurality of routers forming a bi-directional ring-shape data link connected to the data exchange interface and the memories, wherein the plurality of routers comprise a first router connected to the data exchange interface, a second router connected to the CPU and the corresponding memory, and multiple third routers respectively connected to the plurality of cores and the corresponding memories.

16. The NoC device of claim 14, wherein the middle-layer NoC comprises a pair of uni-directional ring-shape data links, each uni-directional ring-shape data link comprising a subset of the plurality of cores.

17. The NoC device of claim 16, wherein the pair of uni-directional ring-shape data links in the middle-layer NoC have opposite data transferring directions, and each of the pair of uni-directional ring-shape data links comprises a subset of the plurality of cores.

18. The NoC device of claim 14, wherein the pair of uni-directional ring-shape data links comprises a first ring and a second ring, the cores in the first ring respectively correspond to the cores in the second ring, and
each core in the first ring is connected to a corresponding core in the second ring with a bi-directional data link.

19. The NoC device of claim 14, wherein the inner-layer NoC comprises a cross-bar network connecting a global buffer of the core to the plurality of PE clusters within the core, and the global buffer of the core is divided into a plurality of banks respectively corresponding to the plurality of PE clusters within the core.

20. The NoC device of claim 14, wherein a data transfer bandwidth of the outer-layer NoC is lower than a data transfer bandwidth of the middle-layer NoC, and the data transfer bandwidth of the middle-layer NoC is lower than a data transfer bandwidth of the inner-layer NoC.

* * * * *